US011517854B2

(12) United States Patent
Dorner et al.

(10) Patent No.: US 11,517,854 B2
(45) Date of Patent: Dec. 6, 2022

(54) PGM CATALYST COUPLED WITH A NON-PGM CATALYST WITH HC OXIDATION CAPABILITY

(71) Applicant: BASF Corporation, Florham Park, NJ (US)

(72) Inventors: Robert Dorner, Hannover (DE); Martin Kalwei, Hannover (DE)

(73) Assignee: BASF Corporation, Florham Park, NJ (US)

( * ) Notice: Subject to any disclaimer, the term of this patent is extended or adjusted under 35 U.S.C. 154(b) by 432 days.

(21) Appl. No.: 16/479,669

(22) PCT Filed: Feb. 13, 2018

(86) PCT No.: PCT/EP2018/053568
§ 371 (c)(1),
(2) Date: Jul. 22, 2019

(87) PCT Pub. No.: WO2018/149829
PCT Pub. Date: Aug. 23, 2018

(65) Prior Publication Data
US 2020/0070092 A1 Mar. 5, 2020

(30) Foreign Application Priority Data

Feb. 14, 2017 (EP) ..................... 17155949

(51) Int. Cl.
*B01D 53/94* (2006.01)
*B01J 21/06* (2006.01)
(Continued)

(52) U.S. Cl.
CPC ....... *B01D 53/944* (2013.01); *B01D 53/9468* (2013.01); *B01D 53/9472* (2013.01);
(Continued)

(58) Field of Classification Search
CPC .............. B01D 53/944; B01D 53/9468; B01D 53/9472; B01D 2255/1021;
(Continued)

(56) References Cited

U.S. PATENT DOCUMENTS

2014/0161679 A1* 6/2014 Chiffey .............. B01D 53/9477
422/170
2015/0125369 A1 5/2015 Kahlert
(Continued)

FOREIGN PATENT DOCUMENTS

CN 104 822 452 A 8/2015
DE 11 2013 000 218 T5 8/2015
(Continued)

OTHER PUBLICATIONS

U.S. Appl. No. 16/462,048, filed May 17, 2019, US 2019-0314795 A1, Robert Dorner.
(Continued)

*Primary Examiner* — Wayne A Langel
(74) *Attorney, Agent, or Firm* — Finnegan, Henderson, Farabow, Garrett & Dunner LLP

(57) ABSTRACT

The present invention relates to a diesel oxidation catalyst comprising a substrate and a wash-coat comprising a first layer and a second layer, wherein the substrate has a substrate length, a front end and a rear end, the washcoat comprising the first layer comprising a first metal oxide and comprising a platinum group metal supported on a metal oxide support material; the second layer comprising a second metal oxide and comprising one or more of an oxidic compound of vanadium, an oxidic compound of tungsten and a zeolitic material comprising one or more of Fe and Cu; wherein the first layer is at least partially disposed directly on the substrate, or is at least partially disposed directly on an intermediate layer which is disposed directly on the
(Continued)

substrate over the entire length of the substrate, on x % of the length of the substrate from the front end of the substrate, and wherein the second layer is at least partially disposed directly on the substrate, or is at least partially disposed directly on the intermediate layer which is disposed directly on the substrate over the entire length of the substrate, on y % of the length of the substrate from the rear end of the substrate, wherein x is in the range of from 25 to 75 and y is in the range of from 25 to 75 and wherein x+y is in the range of from 95 to 105, wherein the intermediate layer comprises alumina.

13 Claims, 4 Drawing Sheets

(51) Int. Cl.
| | |
|---|---|
| B01J 21/12 | (2006.01) |
| B01J 23/30 | (2006.01) |
| B01J 23/42 | (2006.01) |
| B01J 35/00 | (2006.01) |
| B01J 37/02 | (2006.01) |
| B01J 37/08 | (2006.01) |
| F01N 3/10 | (2006.01) |

(52) U.S. Cl.
CPC .......... *B01J 21/063* (2013.01); *B01J 21/066* (2013.01); *B01J 21/12* (2013.01); *B01J 23/30* (2013.01); *B01J 23/42* (2013.01); *B01J 35/0006* (2013.01); *B01J 37/0236* (2013.01); *B01J 37/0244* (2013.01); *B01J 37/08* (2013.01); *F01N 3/103* (2013.01); *B01D 2255/1021* (2013.01); *B01D 2255/20723* (2013.01); *B01D 2255/20776* (2013.01); *B01D 2255/9022* (2013.01); *B01D 2255/9032* (2013.01)

(58) Field of Classification Search
CPC .......... B01D 2255/20723; B01D 2255/20776; B01D 2255/9022; B01D 2255/9032; B01D 2255/65; B01J 21/063; B01J 21/066; B01J 21/12; B01J 23/30; B01J 23/42; B01J 35/0006; B01J 37/0236; B01J 37/0244; B01J 37/08; B01J 23/22; B01J 23/74; B01J 35/023; B01J 23/888; B01J 29/072; B01J 37/038; F01N 3/103; F01N 2510/0682; F01N 2510/0684
USPC .............................. 423/213.5, 212; 422/170
See application file for complete search history.

(56) References Cited

U.S. PATENT DOCUMENTS

2015/0252708 A1* 9/2015 Brown ............... B01D 53/9445
423/212
2019/0331013 A1* 10/2019 Sung ........................ F01N 3/103

FOREIGN PATENT DOCUMENTS

| EP | 2 657 474 A1 | 10/2013 |
|---|---|---|
| JP | A 2016-505359 A | 2/2016 |
| WO | WO 2014/080220 A1 | 5/2014 |
| WO | WO 2015/189680 A1 | 12/2015 |

OTHER PUBLICATIONS

International Search Report dated Apr. 24, 2018 in PCT/EP2018/053568, 6 pages.
International Preliminary Report on Patentability and Written Opinion dated Aug. 20, 2019 in PCT/EP2018/053568, 10 pages.

* cited by examiner

PGM CATALYST COUPLED WITH A NON-PGM CATALYST WITH HC OXIDATION CAPABILITY

The present invention relates to a diesel oxidation catalyst for oxidation of one or more of NO, CO and a hydrocarbon, a process for preparation thereof, a use thereof and an exhaust gas treatment system comprising said diesel oxidation catalyst. Thus, the present invention relates to a novel diesel oxidation catalyst (also abbreviated herein as DOC) and the design of novel exhaust gas treatment systems comprising said diesel oxidation catalyst. In particular, the present invention relates to a diesel oxidation catalyst having a platinum group metal-containing first layer forming an inlet zone and a platinum group metal-free second layer forming an outlet zone, whereby first and second layer, thus, inlet zone and outlet zone, may be either on one substrate or on separate substrates.

In general, all trucks' exhaust gas treatment systems in North America, Japan and the EU are equipped with a diesel particulate filter due to regulatory requirements. Accordingly, very cost-effective solutions have great economic potential due to the pressure on cost minimization. In many current commercial vehicles' exhaust gas treatment systems (e. g. for Euro VI emission levels) a closed-coupled diesel particulate filter is used. The collected soot in the filter must be converted via suitable processes into gaseous substances (usually $CO_2$), so that the filter does not get clogged—this is known as filter regeneration. For this reason, diesel oxidation catalysts (DOCs) are installed upstream of the filter containing relatively high amounts of expensive platinum group metals, in particular platinum or palladium. The DOC can be used so that diesel fuel, which is injected upstream of the catalyst, burns catalytically over the DOC. A temperature is hereby effected at which the filter regeneration starts, depending on the process applied, or is sped-up and made more efficient. Due to the large amounts of platinum group metal used, these catalysts are relatively expensive.

WO 2015/189680 A1 relates to base metal catalysts, emission treatment systems and methods. More specifically, catalysts, systems and methods are disclosed having a base metal catalyst positioned upstream from a particulate filter and a selective catalytic reduction (SCR) catalyst. In systems in which hydrocarbons (e.g. fuel) are periodically injected upstream of the base metal catalyst, the base metal catalyst generates an exotherm over a temperature range of 300° C. to 650° C. to regenerate the downstream particulate filter which has collected soot.

During tests on an engine, it was found that conventionally used vanadium-containing catalysts for selective catalytic reduction (so called V-SCR catalysts) have relatively good properties in the catalytic combustion of diesel fuel—quite comparable to platinum group metal-containing catalysts. Thus, V-SCR catalysts are currently in use in many exhaust gas treatment systems on trucks certified on the older emission level in Europe (e. g. Euro V). They are used for the reduction of nitrogen oxides in the exhaust gas with ammonia (also known as DeNOx reaction). Said V-SCR catalysts are usually free of platinum group metals and therefore comparatively inexpensive.

Besides V-SCR catalysts in the outlet zone, one may also envisage the use of metal-exchanged zeolites (e.g. zeolitic materials comprising one or more of Cu and Fe), as well as metal oxide catalysts such as iron vanadates, cerium oxide, cerium/zirconia oxide or iron oxide. The above mentioned different materials may also be combined with one another. On a coated catalyst, this can be done by mixing, application as separate zones and/or separate layers.

However, if the noble metal free zone is used as the inlet zone, a hydrocarbon may be adsorbed by the inlet zone, in particular when the HC injection temperature falls below the light-off temperature of the hydrocarbons. If this happens and when the temperature would increase until the light-off temperature, instant oxidation of a hydrocarbon may happen leading to such a high temperature that the zone or even the catalyst itself would be damaged loosing its capability to perform appropriately.

Therefore, a major object of the present invention is to maintain the catalyst's properties at reduced platinum group metal loadings and to avoid above mentioned disadvantages. The goal is to overcome this problem and to find a catalyst, which can achieve the HC light-off at low platinum group metal loadings. Thus, it is an object of the present invention to provide a diesel oxidation catalyst effective for the oxidation of one or more of CO, NO and a hydrocarbon, in particular using comparatively low loadings of a platinum group metal. Further, it is an object of the present invention to provide a diesel oxidation catalyst that can effect a favorable temperature, i. e. an exotherm, in particular for regeneration of a catalyzed soot filter.

Thus, it has surprisingly found that a diesel oxidation catalyst comprising a substrate and a washcoat comprising a first layer and a second layer, wherein the substrate has a substrate length, a front end and a rear end, the washcoat comprising the first layer comprising a first metal oxide and comprising a platinum group metal supported on a metal oxide support material;

the second layer comprising a second metal oxide and comprising one or more of an oxidic compound of vanadium, an oxidic compound of tungsten and a zeolitic material comprising one or more of Fe and Cu;

wherein the first layer is at least partially disposed directly on the substrate, or is at least partially disposed directly on an intermediate layer which is disposed directly on the substrate over the entire length of the substrate, on x % of the length of the substrate from the front end of the substrate, and wherein the second layer is at least partially disposed directly on the substrate, or is at least partially disposed directly on the intermediate layer which is disposed directly on the substrate over the entire length of the substrate, on y % of the length of the substrate from the rear end of the substrate, wherein x is in the range of from 25 to 75 and y is in the range of from 25 to 75 and wherein x+y is in the range of from 95 to 105, wherein the intermediate layer comprises alumina, said diesel oxidation catalyst can function as a catalyst for oxidation of one or more of CO, NO and a hydrocarbon. Further, said inventive catalyst can effect a favorable temperature, i. e. an exotherm, especially for regeneration of a particulate filter or a catalyzed soot filter (CSF).

In particular, it has been surprisingly found out that the inventive catalyst is able to minimize hydrocarbon slip from the DOC, also disclosed as $DOC_{out}$ HC slip within the present invention, and concurrently can produce $NO_2$ for the passive regeneration of a CSF. Further, it has surprisingly been found that the inventive catalyst can produce a favorable temperature (i. e. an exotherm) for the CSF regeneration, especially when fuel is dosed in engine cylinder or in exhaust pipe and is burned on the catalyst. Alternatively, the exotherm can be solely produced over the platinum group metal which is supported on a metal oxide support material, in particular if no other material is upstream of the inventive catalyst that is capable of oxidizing a hydrocarbon.

Without being bound to theory, it is assumed that the platinum group metal-containing layer of the inventive catalyst is responsible for the generation of $NO_2$—also known as $NO_2$ make—and for the oxidation of a hydrocarbon during active events. The platinum group metal-free outlet zone would not have an appreciable NO oxidation activity and would only be responsible for lighting off the HC slip, thus, for the oxidation of a hydrocarbon, exiting the platinum group metal containing inlet zone, to achieve a favorable DOC out temperature, in particular an exotherm. Accordingly, the platinum group metal containing inlet zone would carry the main burden for HC light-off, thus, the oxidation of a hydrocarbon, while the outlet zone would act as HC slip control. The above mentioned effects would particularly be observed when fuel is dosed in the engine cylinder or in the exhaust pipe and when the fuel is burned on the catalyst.

Therefore, the present invention relates to a diesel oxidation catalyst as defined above, wherein the second layer comprises an oxidic compound of vanadium, preferably vanadium pentoxide, and an oxidic compound of tungsten, preferably tungsten trioxide, or wherein the second layer comprises an oxidic compound of vanadium, preferably vanadium pentoxide. Thus, it is preferred that the catalyst is used for one or more of the oxidation of NO, the oxidation of a hydrocarbon and the generation of a favorable temperature, in particular an exotherm.

There is no particular restriction as regards the number of layers the washcoat comprises. However, it is preferred that the washcoat comprises two layers being the first and the second layer. More preferably, the washcoat consists of two layers being the first and the second layer.

As regards the first and second layer, it is defined that the first layer is disposed on the substrate from the front end of the substrate whereas the second layer is disposed from the rear end of the substrate. Further, the first layer has a length of x % of the length of the substrate and the second layer has a length of y % of the length of the substrate. Since it is defined that x is in the range of from 25 to 75 and y is in the range of from 25 to 75 said two layers may overlap, be aligned end-to-end, or form a gap resulting in a portion of the substrate not having a layer disposed thereon. Since it is defined that x+y is in the range of from 95 to 105, a possible overlap may have a length in the range of from greater than 0 to 5% of the length of the substrate, thus 5% of the length of the substrate as maximum, whereas a possible gap may have a length in the range of from greater than 0 to 5% of the length of the substrate, thus 5% of the length of the substrate as maximum. It is preferred, however, that the two layers are aligned end-to-end.

Within the above definition of the length of the first layer, there exists no further restriction as to its length. As defined above, x is in the range of from 25 to 75. Preferably, x is in the range of from 30 to 70. More preferably, x is in the range of from 40 to 60, more preferably in the range of from 45 to 55, and more preferably in the range of from 49 to 51. It is particularly preferred that x is 50.

Within the above definition of the length of the second layer, again there exists no further restriction as to its length. As defined above, y is in the range of from 25 to 75. Preferably, y is in the range of from 30 to 70. More preferably, y is in the range of from 40 to 60, more preferably in the range of from 45 to 55, and more preferably in the range of from 49 to 51. It is particularly preferred that y is 50.

It is particularly preferred that x is 50 and y is 50 such that x+y is 100 resulting in a diesel oxidation catalyst wherein the two layers are aligned end-to-end.

As regards the sum of x and y, there exists no further restriction apart from the above mentioned definition that x+y is in the range from 95 to 105. It is preferred that x+y is in the range of from 96 to 104, more preferably in the range of from 97 to 103, more preferably in the range of from 98 to 102 and more preferably in the range of from 99 to 101. It is particularly preferred that x+y is 100.

It is particularly preferred that the first layer is disposed on the substrate on x % of the length of the substrate from the front end of the substrate, and wherein the second layer is disposed on the substrate on y % of the length of the substrate from the rear end of the substrate, wherein x is 50, y is 50 and x+y is accordingly 100.

Thus, it is particularly preferred that the diesel oxidation catalyst of the present invention comprises a substrate and a washcoat comprising a first layer and a second layer, wherein the substrate has a substrate length, a front end and a rear end, wherein the first layer is at least partially disposed directly on the substrate, or is at least partially disposed directly on an intermediate layer which is disposed directly on the substrate over the entire length of the substrate, on 50% of the length of the substrate from the front end of the substrate, wherein the second layer is at least partially disposed directly on the substrate, or is at least partially disposed directly on the intermediate layer which is disposed directly on the substrate over the entire length of the substrate, on 50% of the length of the substrate from the rear end of the substrate, and wherein the second layer comprises an oxidic compound of vanadium, preferably vanadium pentoxide, and an oxidic compound of tungsten, preferably tungsten trioxide, or wherein the second layer comprises an oxidic compound of vanadium, preferably vanadium pentoxide.

As regards the substrate, it may consist of a front substrate component and a rear substrate component. Accordingly, the present invention further relates to a diesel oxidation catalyst comprising a substrate consisting of front substrate component and a rear substrate component, the catalyst further comprising a washcoat comprising a first layer and a second layer, wherein the substrate has a substrate length, the washcoat comprising the first layer comprising a first metal oxide and comprising a platinum group metal supported on a metal oxide support material;

the second layer comprising a second metal oxide and comprising one or more of an oxidic compound of vanadium, an oxidic compound of tungsten and a zeolitic material comprising one or more of Fe and Cu;

wherein the first layer is disposed directly on the front substrate component, or is disposed directly on an intermediate layer which is disposed directly on the front substrate component over the entire length of the front substrate component, over the entire length of the front substrate component, and wherein the second layer is disposed directly on the rear substrate component, or is disposed directly on the intermediate layer which is disposed directly on the rear substrate component over the entire length of the rear substrate component, over the entire length of the rear substrate component, wherein the intermediate layer comprises alumina, wherein the length of the front substrate component is x % of the substrate length and the length of the rear substrate component is y % of the substrate length, wherein x+y is 100.

Within the above definition of the length of the front substrate component, there exists no further restriction as to its length. Thus, x is in the range of from 25 to 75. Preferably, x is in the range of from 30 to 70. More preferably, x is in the range of from 40 to 60, more preferably in the range of from 45 to 55, and more preferably in the range of from 49 to 51. It is particularly preferred that x is 50.

Within the above definition of the length of the rear substrate component, there exists no further restriction as to its length. Thus, y is in the range of from 25 to 75. Preferably, y is in the range of from 30 to 70. More preferably, y is in the range of from 40 to 60, more preferably in the range of from 45 to 55, and more preferably in the range of from 49 to 51. It is particularly preferred that y is 50.

It is particularly preferred that x is 50 and y is 50 such that x+y is 100 resulting in a diesel oxidation catalyst, wherein the front substrate component is of the same length as the rear substrate component.

Concerning the substrate onto which the washcoat comprising a first and a second layer is provided in the inventive catalyst, no particular restrictions apply such that any suitable substrate may be provided to this effect, provided that a washcoat may be disposed thereon. In particular, the type of substrate which may be contained in the inventive catalyst is restricted neither with respect to its shape nor with respect to the materials of which it consists. The same applies for the front substrate component and the rear substrate component in the case where the substrate consists of a front substrate component and a rear substrate component.

Thus, the substrate contained in the inventive catalyst may comprise any suitable substance or substances, wherein the substrate preferably comprises one or more of a ceramic and a metallic substance, and preferably comprises a ceramic substance. Among the preferred ceramic substances, it is particularly preferred that the substrate comprises one or more of alumina, silica, silicates, aluminosilicates, aluminotitanates, silicon carbide (SiC), cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite. Independently thereof, the shape of the substrate comprised in the inventive catalyst may, by way of example, be one or more of a granule, a pellet, a mesh, a ring, a sphere, a cylinder, a hollow cylinder and a monolith, wherein the substrate is preferably a monolith, more preferably a honeycomb monolith, wherein the honeycomb monolith is preferably a wall-flow or flow-through monolith, preferably a flow-through monolith. The same applies for the front substrate component and the rear substrate component in the case where the substrate consists of a front substrate component and a rear substrate component.

Further, it is preferred according to the present invention that the substrate has a plurality of longitudinally extending passages formed by longitudinally extending walls bounding and defining the passages and a longitudinal total length extending between a front end and a rear end of the substrate. The same applies for the front substrate component and the rear substrate component in the case where the substrate consists of a front substrate component and a rear substrate component.

It is particularly preferred that the substrate is a cordierite flow-through honeycomb monolith. In the case where the substrate consists of a front substrate component and a rear substrate component, it is particularly preferred that the front substrate component and the rear substrate component are each a cordierite flow-through honeycomb monolith.

As regards the first metal oxide, no particular restrictions apply such that any suitable metal oxide may be employed. Preferably the first metal oxide is one or more of gamma-alumina, zirconia-alumina, silica-alumina, silica, lanthana, lanthana-alumina, alumina-zirconia-lanthana, titania, zirconia-titania, ceria, ceria-zirconia, ceria-alumina, preferably one or more of silica-alumina, zirconia-alumina, titania and zirconia, more preferably one or more of silica-alumina and zirconia, more preferably silica-alumina and zirconia.

Further, with regard to the first metal oxide, there exist no particular restrictions as to the loading thereof in the first layer. Preferably, the loading of the first metal oxide in the first layer is in the range of from 0.1 to 3 $g/in^3$, preferably of from 0.15 to 2.5 $g/in^3$, more preferably of from 0.2 to 1.75 $g/in^3$, more preferably of from 0.25 to 1.5 $g/in^3$, more preferably of from 0.3 to 1.3 $g/in^3$.

As regards the platinum group metal supported on a metal oxide support material, any suitable platinum group metal can be employed, provided that it can be supported on a metal oxide support material. Preferably, the platinum group metal supported on a metal oxide support material is one or more of Ru, Rh, Pd, Os, Ir and Pt. More preferably, the platinum group metal supported on a metal oxide support material is one or more of Rh, Pd and Pt, more preferably one or more of Pd and Pt, and more preferably Pt.

Further, there is in principle no particular restriction as to the loading of the platinum group metal. Preferably, the loading of the platinum group metal comprised in the first layer is in the range of from 5 to 45 $g/ft^3$, more preferably of from 5 to 35 $g/ft^3$, more preferably of from 10 to 30 $g/ft^3$, more preferably of from 15 to 25 $g/ft^3$.

With respect to the metal oxide support material, any suitable metal oxide support material can be employed, provided that it can be used as a support for the platinum group metal. Preferably, the metal oxide support material is one or more of gamma-alumina, zirconia-alumina, silica-alumina, silica, titania, zirconia, zirconia-titania, titania-alumina, titania-silica, ceria, ceria-zirconia, ceria-alumina, preferably one or more of titania, zirconia, zirconia-titania and titania-alumina, more preferably one or more of titania, zirconia-titania and titania-alumina, more preferably titania.

It is particularly preferred that the platinum group metal supported on a metal oxide support materials is platinum supported on titania.

There is in principle no particular restriction as to the loading of the metal oxide support material. Preferably, the metal oxide support material is comprised in the first layer at a loading in the range of from 0.2 to 3 $g/in^3$, preferably of from 0.4 to 2.5 $g/in^3$, more preferably of from 0.5 to 1.75 $g/in^3$, more preferably of from 0.55 to 1.5 $g/in^3$, more preferably of from 0.6 to 1.3 $g/in^3$.

Further, there is in principle no particular restriction as to the total loading of the first layer. It is preferred, however, that the first layer has a total loading in the range of from 0.5 to 1.5 $g/in^3$, preferably of from 0.6 to 1.4 $g/in^3$, more preferably of from 0.7 to 1.3 $g/in^3$, more preferably of from 0.8 to 1.2 $g/in^3$, more preferably of from 0.9 to 1.1 $g/in^3$.

As regards the second metal oxide, no particular restrictions apply such that any suitable metal oxide may be employed. Preferably the second metal oxide is one or more of gamma-alumina, zirconia-alumina, silica-alumina, silica, lanthana, lanthana-alumina, alumina-zirconia-lanthana, titania, titania-silica, zirconia-titania, ceria, ceria-zirconia, ceria-alumina and ferrous oxide, preferably one or more of silica-alumina, silica, titania and titania-silica, more preferably one or more of silica-alumina, silica and titania, more preferably silica and titania.

Further, with regard to the second metal oxide, there exist no particular restrictions as to the loading thereof in the second layer. Preferably, the loading of the second metal oxide in the second layer is in the range of from 0.5 to 6.0 g/in$^3$, preferably of from 1.0 to 5.8 g/in$^3$, more preferably of from 2.0 to 5.7 g/in$^3$, more preferably of from 3.0 to 5.6 g/in$^3$, more preferably of from 4.0 to 5.5 g/in$^3$.

As regards the oxidic compound of vanadium that may be contained in the second layer of the inventive catalyst, no restrictions apply to the chemical nature of said compound, provided that it comprises an oxygen atom bound to a vanadium atom. It is preferred that the oxidic compound of vanadium is one or more of an ammonium vanadate, a sodium vanadate, an iron vanadate, vanadium pentoxide and vanadium pentoxide stabilized with ferric oxide, preferably vanadium pentoxide. According to the present invention, a vanadate may be a compound containing an oxoanion of vanadium generally in its highest oxidation state of +5. The simplest vanadate may be the $VO_4^{3-}$ anion (orthovanadate), which is present for example in sodium orthovanadate and in solutions of $V_2O_5$ in a strong base (pH>13). Other vanadates may be the $V_2O_7^{4-}$ anion and the $V_3O_9^{3-}$ anion.

As regards the oxidic compound of tungsten that may be contained in the second layer of the inventive catalyst, again no restrictions apply to the chemical nature of said compound, provided that it comprises an oxygen atom bound to a tungsten atom. It is preferred that the oxidic compound of tungsten is one or more of an ammonium tungstate, a sodium tungstate and tungsten trioxide. According to the present invention, a tungstate may be a compound that contains an oxoanion of tungsten or is a mixed oxide containing tungsten. The simplest tungstate ion may be the $WO_4^{2-}$ anion (orthotungstate).

It is preferred that the second layer of the inventive catalyst comprises an oxidic compound of vanadium. Further, it is preferred that the oxidic compound of vanadium is supported on the second metal oxide. It is particularly preferred that the second layer comprises the oxidic compound of vanadium supported on titania.

When the second layer comprises one or more of an oxidic compound of vanadium and an oxidic compound of tungsten, no restriction applies as to the amount of the one or more of an oxidic compound of vanadium and an oxidic compound of tungsten that may be contained in the second layer. Thus, any suitable amount of the one or more of an oxidic compound of vanadium and an oxidic compound of tungsten may be contained in the second layer. In this regard, the amount of an oxidic compound of vanadium is calculated as $V_2O_5$ and the amount of an oxidic compound of tungsten is calculated as $WO_3$. Thus, the second layer may comprise an oxidic compound of vanadium, calculated as $V_2O_5$, in the range of from 0.1 to 7 weight-%, preferably of from 0.5 to 6 weight-%, more preferably of from 1.0 to 5.5 weight-%, more preferably of from 1.5 to 5.2 weight-%, more preferably of from 2.0 to 5.0 weight-% based on the total weight of the second layer. Further, the washcoat may comprise an oxidic compound of tungsten, calculated as $WO_3$, in the range of from 1 to 20 weight-%, preferably of from 3 to 18 weight-%, more preferably of from 5 to 16 weight-%, more preferably of from 6 to 14 weight-%, more preferably of from 8 to 12 weight-%, based on the total weight of the second layer.

When the second layer comprises the oxidic compound of vanadium, no particular restriction applies with respect to the loading thereof. However, it is preferred that the second layer comprises the oxidic compound of vanadium, calculated as vanadium pentoxide, at a loading in the range of from 0.05 to 0.36 g/in$^3$, preferably of from 0.06 to 0.34 g/in$^3$, more preferably of from 0.07 to 0.32 g/in$^3$, more preferably of from 0.08 to 0.30 g/in$^3$, more preferably of from 0.09 to 0.28 g/in$^3$.

When the second layer comprises the oxidic compound of tungsten, no particular restriction applies with respect to the loading thereof. However, it is preferred that the second layer comprises the oxidic compound of tungsten, calculated as tungsten trioxide, at a loading in the range of from 0.25 to 0.65 g/in$^3$, preferably of from 0.3 to 0.6 g/in$^3$, more preferably of from 0.33 to 0.57 g/in$^3$, more preferably of from 0.35 to 0.55 g/in$^3$, more preferably of from 0.37 to 0.53 g/in$^3$.

Therefore, the present invention preferably relates to a diesel oxidation catalyst comprising a washcoat comprising a first layer and a second layer, the first layer comprising an oxidic compound of vanadium, preferably vanadium pentoxide, an oxidic compound of tungsten, preferably tungsten trioxide, titania and silica. Further, it is particularly preferred that the first layer comprises an oxidic compound of vanadium, preferably vanadium pentoxide, an oxidic compound of tungsten, preferably tungsten trioxide, titania and silica, and the second layer comprising zirconia and platinum supported on titania.

Concerning the zeolitic material as such which may be contained in the inventive catalyst, no restrictions apply according to the present invention such that any conceivable zeolitic material may be contained therein. However, it is preferred that the second layer of the inventive catalyst comprises a zeolitic material.

According to the present invention, it is particularly preferred that the framework of the zeolitic material comprises a tetravalent element. It is particularly preferred according to the present invention that the zeolitic material comprises a tetravalent element Y which is one or more of Si, Sn, Ti, Zr and Ge, preferably Si. Further, it is preferred that the framework structure of the zeolitic material comprises a trivalent element X. It is particularly preferred according to the present invention that the zeolitic material comprises one or more of B, Al, Ga and In, preferably Al.

Furthermore, as regards the framework structure of the zeolitic material that may be contained in the inventive catalyst, again no particular restrictions apply such that the zeolitic material may have any framework structure type. Generally, it is conceivable that the framework structure type of the zeolitic material is one of type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type FAU, AFI, MFI, or BEA, more preferably of the type BEA and/or FAU, and more preferably of the type BEA.

With regard to the zeolitic material, it is preferred that it is in its calcined state. According to the present invention, the zeolitic material may comprise any further chemical elements, provided that these elements can establish one or more of the above defined framework type. However, it is preferred that the framework structure of the zeolitic material comprises Si, Al, O and H, and wherein at least 99.0 weight-%, preferably at least 99.5 weight-%, more preferably at least 99.9 weight-% of the framework structure of the zeolitic material consist of Si, Al, O and H.

Further, it is preferred that the second layer of the inventive catalyst comprises a zeolitic material comprising one or more of Cu and Fe. As regards the zeolitic material comprising one or more of Cu and Fe, no restriction applies on how the one or more of Cu and Fe is comprised in the zeolitic material. Thus, the one or more of Cu and Fe may be comprised in the zeolitic material as framework structure element or non-framework structure element. According to the present invention, it is preferred that the one or more of Cu and Fe is comprised in the zeolitic material as non-framework structure element.

As mentioned above, it is preferred that the second layer comprises a zeolitic material comprising one or more of Cu and Fe. Further, it is particularly preferred that the second layer comprises a zeolitic material comprising Cu, preferably as non-framework structure element.

When the zeolitic material comprising Cu is comprised in the second layer, it is further preferred that the zeolitic material comprises Si, Al, O, H and Cu in any conceivable amount thereof. However, it is preferred that at least 99.0 weight-%, preferably at least 99.5 weight-%, more preferably at least 99.9 weight-% of the zeolitic material consist of Si, Al, O, H and Cu.

When the second layer comprises a zeolitic material comprising Cu, any suitable amount of Cu may be comprised in the zeolitic material. The zeolitic material preferably comprises Cu, calculated as CuO, in an amount in the range of from 0.1 to 5 weight-%, more preferably of from 1.0 to 4.5 weight-%, more preferably of from 2 to 4 weight-%, more preferably of from 2.5 to 3.5 weight-%, more preferably of from 3 to 3.5 weight-%, based on the total weight of the zeolitic material.

When the second layer comprises a zeolitic material comprising Fe, it is preferred that the zeolitic material comprises Fe as a non-framework structure element. Further preferably, the framework structure of the zeolitic material comprises Si and Al and that the zeolitic material comprises Fe. The zeolitic material comprises Si, Al, O, H and Fe in any conceivable amounts. It is preferred that at least 99.0 weight-%, preferably at least 99.5 weight-%, more preferably at least 99.9 weight-% of the zeolitic material consist of Si, Al, O, H and Fe. When the second layer comprises a zeolitic material comprising Fe, any suitable amount of Fe may be comprised in the one or more of a zeolitic material. Thus, the zeolitic material may comprise Fe, calculated as $Fe_2O_3$, in an amount in the range of from 0.1 to 5 weight-%, preferably of from 1.0 to 4.5 weight-%, more preferably of from 2 to 4 weight-%, more preferably of from 3 to 3.5 weight-%, based on the total weight of the zeolitic material.

Further, it is preferred that at least 95 weight-%, preferably at least 99 weight-%, more preferably at least 99.9 weight-%, more preferably at least 99.99 weight-% of the second layer of the diesel oxidation catalyst as defined hereinabove consists of the second metal oxide, preferably titania and silica, the one or more of an oxidic compound of vanadium, preferably vanadium pentoxide, and an oxidic compound of tungsten, preferably tungsten trioxide.

It is particularly preferred that the diesel oxidation catalyst as defined herein consists of the substrate and the first and the second layer. In this regard, it is preferred that at least 95 weight-%, preferably at least 99 weight-%, more preferably at least 99.9 weight-%, more preferably at least 99.99 weight-% of the first layer consists of the first metal oxide, preferably silica-alumina and zirconia, and the platinum group metal supported on a metal oxide support material, preferably platinum supported on titania, and that at least 95 weight-%, preferably at least 99 weight-%, more preferably at least 99.9 weight-%, more preferably at least 99.99 weight-% of the second layer consists of the second metal oxide, preferably silica and titania, and the one or more of an oxidic compound of vanadium, an oxidic compound of tungsten and a zeolitic material comprising one or more of Cu and Fe, preferably vanadium pentoxide and tungsten trioxide.

As defined hereinabove, an intermediate may be disposed directly on the substrate over the entire length of the substrate. It is preferred that an intermediate layer is disposed directly on the substrate in the case when the substrate is a metallic substance. As defined above, the intermediate layer comprises alumina, preferably consist of alumina. As regards the intermediate layer, no restriction applies to the loading thereof. However, it is preferred that the intermediate layer has a loading in the range of from 0.2 to 3 g/in³, preferably of from 0.5 to 2.5 g/in³, more preferably of from 0.5 to 2 g/in³, more preferably of from 0.7 to 1.5 g/in³, more preferably of from 0.75 to 1.25 g/in³.

Further, it is preferred that the diesel oxidation catalyst, preferably as defined hereinabove, consists of the substrate, wherein the substrate is a metallic substance, and of the intermediate layer, the first layer and the second layer.

Furthermore, it is preferred according to the present invention that the inventive catalyst according to any of the particular and preferred embodiments defined in the present invention is used in a process for treating an exhaust gas, preferably for treating an exhaust gas from an internal combustion engine, more preferably for treating an exhaust gas from a diesel engine, more preferably for treating an exhaust gas from a lean-burn diesel engine, preferably for one or more of the selective catalytic reduction of $NO_x$, the oxidation of one or more of carbon monoxide, nitrogen monoxide and a hydrocarbon comprised in said exhaust gas, more preferably for one or more of the oxidation of carbon monoxide, the oxidation of nitrogen monoxide and the oxidation of a hydrocarbon comprised in said exhaust gas.

Moreover, the present invention relates to the use of the diesel oxidation catalyst as defined herein for one or more of the selective catalytic reduction of $NO_x$, the oxidation of one or more of carbon monoxide, nitrogen monoxide and a hydrocarbon, preferably for one or more of the oxidation of carbon monoxide, the oxidation of nitrogen monoxide and the oxidation of a hydrocarbon, wherein one or more of the $NO_x$ and the one or more of carbon monoxide, nitrogen monoxide and a hydrocarbon are preferably comprised in an exhaust gas, more preferably in an exhaust gas from a diesel engine, more preferably in an exhaust gas from a lean-burn diesel engine.

Moreover, the present invention relates to a method for one or more of the selective catalytic reduction of $NO_x$ and the catalytic oxidation of one or more of carbon monoxide, nitrogen monoxide and a hydrocarbon, preferably for one or more of the oxidation of carbon monoxide, the oxidation of nitrogen monoxide and the oxidation of a hydrocarbon, wherein one or more of the $NO_x$ and the one or more of carbon monoxide, nitrogen monoxide and a hydrocarbon are preferably comprised in an exhaust gas, more preferably in an exhaust gas from a diesel engine, more preferably in an exhaust gas from a lean-burn diesel engine, said method comprising employing the diesel oxidation catalyst of any of the particular and preferred embodiments defined in the present invention.

Further, the present invention relates to a method for the catalytic treatment of an exhaust gas, preferably for treating an exhaust gas from an internal combustion engine, more preferably for treating an exhaust gas from a diesel engine, more preferably for treating an exhaust gas from a lean-burn diesel engine, said method comprising employing the diesel oxidation catalyst of any of the particular and preferred embodiments defined in the present invention.

According to a particular preferred embodiment of the present invention, the of any of the particular and preferred embodiments defined herein is comprised in an exhaust gas treatment system which is preferably in fluid communication with an internal combustion engine, preferably a diesel engine, more preferably a lean-burn diesel engine.

Moreover, the present invention relates to an exhaust gas treatment system, preferably in fluid communication with an internal combustion engine, said exhaust gas system comprising the diesel oxidation catalyst described hereinabove and in any one of the particular and preferred embodiments defined in the present invention, wherein the internal combustion engine is preferably a diesel engine, more preferably a lean-burn diesel engine. As regards the exhaust gas treatment system of the present invention, no particular restrictions apply as to any further components which may be comprised therein.

It is preferred that the exhaust gas treatment system as defined hereinabove further comprises one or more of a hydrocarbon injector upstream of the diesel oxidation catalyst, a hydrocarbon in-cylinder post injector, a reductant injector, preferably a urea injector, downstream of the diesel oxidation catalyst, a catalyst for selective catalytic reduction and a catalyst for ammonia oxidation, preferably one or more of a hydrocarbon injector upstream of the diesel oxidation catalyst and a hydrocarbon in-cylinder post injector.

Moreover, the present invention relates to a process for preparing the diesel oxidation catalyst of any of the particular and preferred embodiments as defined hereinabove, wherein the diesel oxidation catalyst comprises one substrate, the process comprising (a) optionally disposing an intermediate slurry directly on the substrate, obtaining an intermediate slurry-treated substrate;
(b1) disposing a second slurry on the substrate, or on the intermediate slurry-treated substrate, obtaining a second slurry-treated substrate,
  wherein the second slurry comprises the second metal oxide and the one or more of an oxidic compound of vanadium, an oxidic compound of tungsten and a zeolitic material comprising one or more of Fe and Cu;
(c1) drying the second slurry-treated substrate;
(d1) calcining the dried second slurry-treated substrate, obtaining a substrate having the second layer disposed thereon;
(e1) disposing a first slurry on the substrate having the second layer disposed thereon, obtaining a first slurry-treated substrate having the second layer disposed thereon,
  wherein the first slurry comprises the first metal oxide and the platinum group metal supported on a metal oxide support material;
(f1) drying the first slurry-treated substrate having the second layer disposed thereon;
(g1) calcining the dried first slurry-treated substrate having the second layer disposed thereon, obtaining a substrate having the first and the second layer disposed thereon;
or
(b2) disposing a first slurry on the substrate, or on the intermediate slurry-treated substrate, obtaining a first slurry-treated substrate,
  wherein the first slurry comprises the first metal oxide and the platinum group metal supported on a metal oxide support material;
(c2) drying the first slurry-treated substrate;
(d2) calcining the dried first slurry-treated substrate, obtaining a substrate having the first layer disposed thereon;
(e2) disposing a second slurry on the substrate having the first layer disposed thereon, obtaining a second slurry-treated substrate having the first layer disposed thereon,
  wherein the second slurry comprises the second metal oxide and the one or more of an oxidic compound of vanadium, an oxidic compound of tungsten and a zeolitic material comprising one or more of Fe and Cu;
(f2) drying the second slurry-treated substrate having the first layer disposed thereon;
(g2) calcining the dried second slurry-treated substrate having the first layer disposed thereon, obtaining a substrate having the first and the second layer disposed thereon.

The term "intermediate slurry" as disclosed herein particularly refers to a slurry prepared for being disposed on a substrate to form an intermediate slurry-treated substrate which may be dried and/or calcined such that an intermediate layer is formed.

It is preferred that the first slurry comprises one or more of water, preferably distilled water, acetic acid and nitric acid.

Further, it is preferred that the second slurry comprises one or more of water, preferably distilled water, and ammonium hydroxide.

As regards the drying in (c1), (f1), (c2) and/or (f2), no restrictions apply such that the drying may be effected in any suitable manner, provided that the slurry-treated substrate obtained from (b1), (e1), (b2) and/or (e2) is dried to some extent. Thus, it is preferred according to the present invention that a gas atmosphere is used for heat exchange to this effect. As regards the gas atmosphere for the drying in (c1), (f1), (c2) and/or (f2), no particular restrictions apply such that any gas may be used, provided that the gas is suitable for providing a gas atmosphere at a temperature useful for heat exchange. Thus, by way of example, the gas atmosphere may comprise one or more of nitrogen, oxygen, an inert gas and carbon dioxide, preferably nitrogen. Alternatively, the gas atmosphere may comprise air or consists of air.

As regards the temperature of the gas atmosphere for drying in (c1), (f1), (c2) and/or (f2), no particular restriction applies such that any suitable temperature may be chosen provided that the slurry-treated substrate obtained in (b1), (e1), (b2) and/or (e2) may be dried to a certain extent, resulting in a dried slurry-treated substrate. Thus, by way of example, drying in (c1), (f1), (c2) and/or (f2) may be effected using a gas atmosphere having a temperature in the range of from 100 to 180° C. preferably of from 120 to 160° C., and more preferably of from 135 to 145° C.

As regards the calcining in (d1), (g1), (d2) and/or (g2), no restrictions apply such that the calcining may be effected in any suitable manner, provided that the dried slurry-treated substrate is calcined to some extent, and provided that the calcining results in a substrate having a first layer disposed thereon. However, it is preferred according to the present invention that a gas atmosphere is used for heat exchange to this effect. As regards the gas atmosphere for the calcining in (d1), (g1), (d2) and/or (g2) the same applies as for the gas atmosphere for the drying, such that in principle any gas may be used, provided that the gas is suitable for providing a gas atmosphere at a temperature useful for calcining. Thus, by way of example, the gas atmosphere may comprise one or more of nitrogen, oxygen, an inert gas and carbon dioxide, preferably nitrogen.

As regards the temperature of the gas atmosphere for calcining in (d1), (g1), (d2) and/or (g2) any suitable temperature may be chosen in principle, provided that the dried slurry-treated substrate obtained from (c1), (f1), (c2) and/or (f2) may be effectively calcined. Thus, by way of example, calcining in (d1), (g1), (d2) and/or (g2) may be effected using a gas atmosphere having a temperature in the range of from 350 to 550° C., preferably of from 420 to 480° C., more preferably of from 440 to 460° C.

When the one or more slurries comprise a first and a second slurry, there is no restriction with regard to the order in which the first slurry and the second slurry are disposed on the substrate as long as the first slurry and the second slurry are at least partially disposed on the substrate or on the intermediate layer which is disposed directly over the entire length of the substrate. Thus, by way of example, the disposal of the first slurry may be carried out before the disposal of the second slurry or vice versa. It is, however, preferred that the second slurry is disposed on the substrate or on the intermediate layer and the first slurry is disposed on the substrate or on the intermediate layer whereby the second slurry was already disposed thereon.

As regards the method for disposing one or more of the first slurry and the second slurry, no restriction applies such that any suitable method may be applied to this effect, provided that a slurry-treated substrate is obtained accordingly. However, it is preferred according to the present invention that disposing one or more of the first slurry and the second slurry is effected by wet impregnation or spraying, preferably by wet impregnation.

Moreover, the present invention relates to a diesel oxidation catalyst of any of the particular and preferred embodiments defined in the present invention, obtainable or obtained by a process as defined hereinabove.

The terms "front end of the substrate" and "rear end of the substrate" as disclosed herein particularly define the substrate relative to a gas stream passing the catalyst from the front end of the substrate to the rear end of the substrate. In the case wherein the substrate has a plurality of longitudinally extending passages formed by longitudinally extending walls bounding and defining the passages the gas stream would pass said passages from the inlet end to the outlet end thus, from the front end of the substrate to the rear end of the substrate.

Thus, the terms "front end of the substrate" and "rear end of the substrate" particularly define the geometrical setting of the DOC relative to the direction of a gas stream. More specifically, the terms "front end of the substrate" and "rear end of the substrate" as disclosed herein particularly define the substrate since it is intended that the substrate is applied in a system, wherein the system comprises a gas stream having a direction which may be defined as a vector. Thus, the substrate is applied in a system such that the vector of the gas stream is in parallel to a vector reaching from the front end of the substrate to the rear end of the substrate. Further, the front end of the substrate may be designated as an upstream end whereas the rear end of the substrate may be designated as a downstream end.

Within the disclosure of the present invention, the portion of the substrate comprising the platinum group metal containing layer, i. e. the first layer, may be designated as the inlet zone. Consequently, the portion of the substrate comprising the second layer may be designated as the outlet zone.

As regards the value of the loading of a designated substance in a designated layer on the substrate expressed in grams per cubic inch, it is noted that within the meaning of the present invention the weight in grams refers to the weight of the designated substance and the volume expressed in cubic inches refers to the volume of the substrate having the designated layer disposed thereon and preferably calculated without the designated layer disposed thereon, wherein said volume includes any pores, cavities, and channels which may be present in the substrate form. In particular, in particularly preferred instances wherein a honeycomb monolith substrate is employed, the volume refers to the total volume of the honeycomb substrate including the channels contained therein.

Accordingly, as regards the value of the loading of the first metal oxide on the substrate expressed in grams per cubic inch, it is noted that within the meaning of the present invention the weight in grams refers to the weight of the first metal oxide and the volume expressed in cubic inches refers to the volume of the substrate having the first layer disposed thereon, calculated without the first layer disposed thereon, wherein said volume includes any pores, cavities, and channels which may be present in the substrate. In particular, when a honeycomb monolith substrate is used, the volume refers to the total volume of the honeycomb substrate including the channels contained therein. The same applies to the loading of the platinum group metal (expressed in grams per cubic foot) and the loading of the metal oxide support material in the first layer. With respect to the intermediate layer, the same applies to the loading of the alumina. With respect to the second layer, the same applies to the loading of the second metal oxide, the loading of the oxidic compound of vanadium, the loading of the oxidic compound of tungsten and the loading of the zeolitic material comprising one or more of Cu and Fe. The units inch (abbreviated as "in") and foot (abbreviated as "ft") as disclosed herein refer to units of length in the imperial and United States customary systems of measurements. There are 12 inches in a foot. One inch is equal to 2.54 cm.

The present invention is further illustrated by the following set of embodiments and combinations of embodiments resulting from the dependencies and back-references as indicated. In particular, it is noted that in each instance where a range of embodiments is mentioned, for example in the context of a term such as "The diesel oxidation catalyst of any one of embodiments 1 to 4", every embodiment in this range is meant to be explicitly disclosed for the skilled person, i.e. the wording of this term is to be understood by the skilled person as being synonymous to "The diesel oxidation catalyst of any one of embodiments 1, 2, 3, and 4".

1. A diesel oxidation catalyst comprising a substrate and a washcoat comprising a first layer and a second layer and optionally an intermediate layer, wherein the substrate has a substrate length, a front end and a rear end, the washcoat comprising
    the first layer comprising a first metal oxide and comprising a platinum group metal supported on a metal oxide support material;
    the second layer comprising a second metal oxide and comprising one or more of an oxidic compound of vanadium, an oxidic compound of tungsten and a zeolitic material comprising one or more of Fe and Cu;
    wherein the first layer is at least partially disposed directly on the substrate or is at least partially disposed directly on an intermediate layer which is disposed directly on the substrate over the entire length of the substrate, on x % of the length of the substrate from the front end of the substrate, and
    wherein the second layer is at least partially disposed directly on the substrate or is at least partially disposed directly on the intermediate layer which is disposed directly on the substrate over the entire length of the substrate, on y % of the length of the substrate from the rear end of the substrate,
    wherein x is in the range of from 25 to 75 and y is in the range of from 25 to 75 and
    wherein x+y is in the range of from 95 to 105,
    wherein the intermediate layer comprises alumina.
2. The diesel oxidation catalyst of embodiment 1, wherein x is in the range of from 30 to 70, preferably in the range of from 40 to 60, more preferably in the range of from 45 to 55, more preferably in the range of from 49 to 51.
3. The diesel oxidation catalyst of embodiment 1 or 2, wherein x is 50.
4. The diesel oxidation catalyst of any one of embodiments 1 to 3, wherein y is in the range of from 30 to 70, preferably in the range of from 40 to 60, more preferably in the range of from 45 to 55, more preferably in the range of from 49 to 51.
5. The diesel oxidation catalyst of any one of embodiments 1 to 4, wherein y is 50.
6. The diesel oxidation catalyst of any one of embodiments 1 to 5, wherein x+y is in the range of from 96 to 104, preferably in the range of from 97 to 103, more preferably in the range of from 98 to 102, more preferably in the range of from 99 to 101.
7. The diesel oxidation catalyst of any one of embodiments 1 to 5, wherein x+y is 100.
8. The diesel oxidation catalyst of any one of embodiments 1 to 6, wherein the first layer is disposed on the substrate on x % of the length of the substrate from the front end of the substrate, and wherein the second layer is disposed on the substrate on y % of the length of the substrate from the rear end of the substrate, wherein x is 50, y is 50 and x+y is 100.
9. The diesel oxidation catalyst of any one of embodiments 1 to 8, wherein the substrate consists of a front substrate component and a rear substrate component,
    wherein the first layer is directly disposed on the front substrate component, or on an intermediate layer which is directly disposed on the entire length of the front substrate component,
    wherein the second layer is directly disposed on the rear substrate component, or on an intermediate layer which is directly disposed on the entire length of the rear substrate component,
    wherein the length of the front substrate component is x % of the substrate length and the length of the rear substrate component is y % of the substrate length, wherein x+y is 100.
10. The diesel oxidation catalyst of any one of embodiments 1 to 9, wherein the substrate comprises a ceramic and/or a metallic substance, preferably a ceramic substance, more preferably a ceramic substance which is one or more of alumina, silica, silicates, aluminosilicates, aluminotitanates, silicon carbide, cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite.
11. The diesel oxidation catalyst of any one of embodiments 1 to 10, wherein the substrate is one or more of a granule, a pellet, a mesh, a ring, a sphere, a cylinder, a hollow cylinder and a monolith, wherein the substrate is preferably a monolith, more preferably a honeycomb monolith, wherein the honeycomb monolith is preferably a wall-flow or flow-through monolith, preferably a flow-through monolith.
12. The diesel oxidation catalyst of any one of embodiments 1 to 11, wherein the substrate has a plurality of longitudinally extending passages formed by longitudinally extending walls bounding and defining the passages and a longitudinal total length extending between the front end and the rear end of the substrate.
13. The diesel oxidation catalyst of any one of embodiments 1 to 12, wherein the first metal oxide is one or more of gamma-alumina, zirconia-alumina, silica-alumina, silica, lanthana, lanthana-alumina, alumina-zirconia-lanthana, titania, zirconia-titania, ceria, ceria-zirconia, ceria-alumina, preferably one or more of silica-alumina, zirconia-alumina, titania and zirconia, more preferably one or more of silica-alumina and zirconia, more preferably silica-alumina and zirconia.
14. The diesel oxidation catalyst of any one of embodiments 1 to 13, wherein the first layer comprises the first metal oxide at a loading in the range of from 0.1 to 3 $g/in^3$, preferably of from 0.15 to 2.5 $g/in^3$, more preferably of from 0.2 to 1.75 $g/in^3$, more preferably of from 0.25 to 1.5 $g/in^3$, more preferably of from 0.3 to 1.3 $g/in^3$.
15. The diesel oxidation catalyst of any one of embodiments 1 to 14, wherein the platinum group metal is one or more of Pt, Pd and Rh, preferably one or more of Pt and Pd, more preferably Pt.
16. The diesel oxidation catalyst of any one of embodiments 1 to 15, wherein the first layer comprises the platinum group metal at a loading in the range of from 5 to 45 $g/ft^3$, more preferably of from 5 to 35 g/ft³, more preferably of from 10 to 30 g/ft³, more preferably of from 15 to 25 g/ft³.

17. The diesel oxidation catalyst of any one of embodiments 1 to 16, wherein the metal oxide support material is one or more of gamma-alumina, zirconia-alumina, silica-alumina, silica, titania, zirconia, zirconia-titania, titania-alumina, titania-silica, ceria, ceria-zirconia, ceria-alumina, preferably one or more of titania, zirconia, zirconia-titania and titania-alumina, more preferably one or more of titania, zirconia-titania and titania-alumina, more preferably titania.

18. The diesel oxidation catalyst of any one of embodiments 1 to 17, wherein the first layer comprises the metal oxide support material at a loading in the range of from 0.2 to 3 g/in³, preferably of from 0.4 to 2.5 g/in³, more preferably of from 0.5 to 1.75 g/in³, more preferably of from 0.55 to 1.5 g/in³, more preferably of from 0.6 to 1.3 g/in³.

19. The diesel oxidation catalyst of any one of embodiments 1 to 18, wherein the first layer has a total loading of from 0.5 to 1.5 g/in³, preferably of from 0.6 to 1.4 g/in³, more preferably of from 0.7 to 1.3 g/in³, more preferably of from 0.8 to 1.2 g/in³, more preferably of from 0.9 to 1.1 g/in³.

20. The diesel oxidation catalyst of any one of embodiments 1 to 19, wherein the second metal oxide is one or more of gamma-alumina, zirconia-alumina, silica-alumina, silica, lanthana, lanthana-alumina, alumina-zirconia-lanthana, titania, titania-silica, zirconia-titania, ceria, ceria-zirconia, ceria-alumina and ferrous oxide, preferably one or more of silica-alumina, silica, titania and titania-silica, more preferably one or more of silica-alumina, silica and titania, more preferably silica and titania.

21. The diesel oxidation catalyst of any one of embodiments 1 to 20, wherein the second layer comprises the second metal oxide at a loading in the range of from 0.5 to 6.0 g/in³, preferably of from 1.0 to 5.8 g/in³, more preferably of from 2.0 to 5.7 g/in³, more preferably of from 3.0 to 5.6 g/in³, more preferably of from 4.0 to 5.5 g/in³.

22. The diesel oxidation catalyst of any one of embodiments 1 to 21, wherein the oxidic compound of V is one or more of an ammonium vanadate, a sodium vanadate, an iron vanadate, vanadium pentoxide and vanadium pentoxide stabilized with ferric oxide, preferably vanadium pentoxide.

23. The diesel oxidation catalyst of any one of embodiments 1 to 22, wherein the oxidic compound of W is one or more of an ammonium tungstate, a sodium tungstate and tungsten trioxide, preferably tungsten trioxide.

24. The diesel oxidation catalyst of any one of embodiments 1 to 23, wherein the framework structure of the zeolitic material comprises a tetravalent element Y which is one or more of Si, Sn, Ti, Zr and Ge, preferably Si.

25. The diesel oxidation catalyst of any one of embodiments 1 to 24, wherein the framework structure of the zeolitic material comprises a trivalent element X which is one or more of B, Al, Ga and In, preferably Al.

26. The diesel oxidation catalyst of any one of embodiments 1 to 25, wherein the zeolitic material has a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type FAU, AFI, MFI, or BEA, more preferably of the type BEA and/or FAU, and more preferably of the type BEA.

27. The diesel oxidation catalyst of any one of embodiments 1 to 26, wherein the framework structure of the zeolitic material comprises Si, Al, O and H, and wherein at least 99.0 weight-%, preferably at least 99.5 weight-%, more preferably at least 99.9 weight-% of the framework structure of the zeolitic material consist of Si, Al, O and H.

28. The diesel oxidation catalyst of any one of embodiments 1 to 27, wherein the framework structure of the zeolitic material comprises Si and Al and the zeolitic material comprises Cu.

29. The diesel oxidation catalyst of any one of embodiments 1 to 28, wherein the zeolitic material comprises Cu, calculated as CuO, respectively, in an amount in the range of from 0.1 to 5 weight-%, preferably of from 1.0 to 4.5 weight-%, more preferably of from 2 to 4 weight-%, more preferably of from 2.5 to 3.5 weight-%, more preferably of from 3 to 3.5 weight-%, based on the total weight of the zeolitic material.

30. The diesel oxidation catalyst of any one of embodiments 1 to 29, wherein the framework structure of the zeolitic material comprises Si and Al and the zeolitic material comprises Fe.

31. The diesel oxidation catalyst of any one of embodiments 1 to 30, wherein the zeolitic material comprises Fe, calculated as $Fe_2O_3$, respectively, in an amount in the range of from 0.1 to 5 weight-%, preferably of from 1.0 to 4.5 weight-%, more preferably of from 2 to 4 weight-%, more preferably of from 3 to 3.5 weight-%, based on the total weight of the zeolitic material.

32. The diesel oxidation catalyst of any one of embodiments 1 to 31, wherein the second layer comprises the oxidic compound of vanadium, wherein the loading of the oxidic compound of vanadium in the second layer is in the range of from 0.05 to 0.36 g/in³, preferably of from 0.06 to 0.34 g/in³, more preferably of from 0.07 to 0.32 g/in³, more preferably of from 0.08 to 0.30 g/in³, more preferably of from 0.09 to 0.28 g/in³.

33. The diesel oxidation catalyst of any one of embodiments 1 to 32, wherein the second layer comprises the oxidic compound of tungsten, wherein the loading of the oxidic compound of tungsten is in the range of from 0.25 to 0.65 g/in³, preferably of from 0.3 to 0.6 g/in³, more preferably of from 0.33 to 0.57 g/in³, more preferably of from 0.35 to 0.55 g/in³, more preferably of from 0.37 to 0.53 g/in³.

34. The diesel oxidation catalyst of any one of embodiments 1 to 33, wherein at least 95 weight-%, preferably at least 99 weight-%, more preferably at least 99.9 weight-%, more preferably at least 99.99 weight-% of the second layer consists of the second metal oxide and the one or more of an oxidic compound of vanadium, an oxidic compound of tungsten and a zeolitic material comprising one or more of Fe and Cu.

35. The diesel oxidation catalyst of any one of embodiments 1 to 34, consisting of the substrate and the first layer and the second layer.

36. The diesel oxidation catalyst of any one of embodiments 1 to 35, wherein the intermediate layer comprises alumina, preferably consists of alumina, at a loading in the range of from 0.2 to 3 g/in³, preferably of from 0.5 to 2.5 g/in³, more preferably of from 0.5 to 2 g/in³, more preferably of from 0.7 to 1.5 g/in³, more preferably of from 0.75 to 1.25 g/in³.

37. The diesel oxidation catalyst of any one of embodiments 1 to 34, wherein the substrate is a metallic substance and the washcoat comprises the intermediate layer, wherein the diesel oxidation catalyst preferably consists of the substrate, the intermediate layer, the first layer and the second layer.

38. The diesel oxidation catalyst of any one of embodiments 1 to 37 for use as a catalyst in a process for treating an exhaust gas, preferably for treating an exhaust gas from an internal combustion engine, more preferably for treating an exhaust gas from a diesel engine, more preferably for treating an exhaust gas from a lean-burn diesel engine, preferably for one or more of the selective catalytic reduction of $NO_x$, the oxidation of one or more of carbon monoxide, nitrogen monoxide and a hydrocarbon comprised in said exhaust gas, more preferably for one or more of, the oxidation of carbon monoxide, the oxidation of nitrogen monoxide and the oxidation of a hydrocarbon comprised in said exhaust gas.

39. Use of the diesel oxidation catalyst of any one of embodiments 1 to 37 for one or more of the selective catalytic reduction of $NO_x$, the oxidation of one or more of carbon monoxide, nitrogen monoxide and a hydrocarbon, preferably for one or more of the oxidation of carbon monoxide, the oxidation of nitrogen monoxide and the oxidation of a hydrocarbon, wherein one or more of the $NO_x$ and the one or more of carbon monoxide, nitrogen monoxide and a hydrocarbon are preferably comprised in an exhaust gas, more preferably in an exhaust gas from a diesel engine, more preferably in an exhaust gas from a lean-burn diesel engine.

40. A method for one or more of the selective catalytic reduction of $NO_x$ and the catalytic oxidation of one or more of carbon monoxide, nitrogen monoxide and a hydrocarbon, preferably for one or more of the oxidation of carbon monoxide, the oxidation of nitrogen monoxide and the oxidation of a hydrocarbon, wherein one or more of the $NO_x$ and the one or more of carbon monoxide, nitrogen monoxide and a hydrocarbon are preferably comprised in an exhaust gas, more preferably in an exhaust gas from a diesel engine, more preferably in an exhaust gas from a lean-burn diesel engine, said method comprising employing the diesel oxidation catalyst of any one of embodiments 1 to 37 as catalyst.

41. A method for the catalytic treatment of an exhaust gas, preferably for treating an exhaust gas from an internal combustion engine, more preferably for treating an exhaust gas from a diesel engine, more preferably for treating an exhaust gas from a lean-burn diesel engine, said method comprising employing the diesel oxidation catalyst of any one of embodiments 1 to 37 as catalyst.

42. The diesel oxidation catalyst of any one of embodiments 1 to 37, wherein the catalyst is comprised in an exhaust gas treatment system which is preferably in fluid communication with an internal combustion engine, preferably a diesel engine, more preferably a lean-burn diesel engine.

43. An exhaust gas treatment system, preferably in fluid communication with an internal combustion engine, said exhaust gas system comprising the diesel oxidation catalyst of any one of embodiments 1 to 37, wherein the internal combustion engine is preferably a diesel engine, more preferably a lean-burn diesel engine.

44. The exhaust gas treatment system of embodiment 43, further comprising one or more of a hydrocarbon injector upstream of the diesel oxidation catalyst, a hydrocarbon in-cylinder post injector, a reductant injector, preferably a urea injector, downstream of the diesel oxidation catalyst, a catalyst for selective catalytic reduction and a catalyst for ammonia oxidation, preferably one or more of a hydrocarbon injector upstream of the diesel oxidation catalyst and a hydrocarbon in-cylinder post injector.

45. A process for preparing a diesel oxidation catalyst of any one of embodiments 1 to 37, wherein the diesel oxidation catalyst comprises one substrate,
the process comprising
(a) optionally disposing an intermediate slurry directly on the substrate, obtaining an intermediate slurry-treated substrate;
(b1) disposing a second slurry on the substrate, or on the intermediate slurry-treated substrate, obtaining a second slurry-treated substrate,
wherein the second slurry comprises the second metal oxide and the one or more of an oxidic compound of vanadium, an oxidic compound of tungsten and a zeolitic material comprising one or more of Fe and Cu;
(c1) drying the second slurry-treated substrate;
(d1) calcining the dried second slurry-treated substrate, obtaining a substrate having the second layer disposed thereon;
(e1) disposing a first slurry on the substrate having the second layer disposed thereon, obtaining a first slurry-treated substrate having the second layer disposed thereon,
wherein the first slurry comprises the first metal oxide and the platinum group metal supported on a metal oxide support material;
(f1) drying the first slurry-treated substrate having the second layer disposed thereon;
(g1) calcining the dried first slurry-treated substrate having the second layer disposed thereon, obtaining a substrate having the first and the second layer disposed thereon;
or
(b2) disposing a first slurry on the substrate, or on the intermediate slurry-treated substrate, obtaining a first slurry-treated substrate,
wherein the first slurry comprises the first metal oxide and the platinum group metal supported on a metal oxide support material;
(c2) drying the first slurry-treated substrate;

(d2) calcining the dried first slurry-treated substrate, obtaining a substrate having the first layer disposed thereon;

(e2) disposing a second slurry on the substrate having the first layer disposed thereon, obtaining a second slurry-treated substrate having the first layer disposed thereon, wherein the second slurry comprises the second metal oxide and the one or more of an oxidic compound of vanadium, an oxidic compound of tungsten and a zeolitic material comprising one or more of Fe and Cu;

(f2) drying the second slurry-treated substrate having the first layer disposed thereon;

(g2) calcining the dried second slurry-treated substrate having the first layer disposed thereon, obtaining a substrate having the first and the second layer disposed thereon.

46. The process of embodiment 45, wherein the first slurry comprises one or more of water, preferably distilled water, acetic acid and nitric acid.

47. The process of embodiment 45 or 46, wherein the second slurry comprises one or more of water, preferably distilled water, and ammonium hydroxide.

48. The process of any one of embodiments 45 to 47, wherein the drying according to one or more of (c1), (f1), (c2) and (f2) is effected using a gas atmosphere having a temperature in the range of from 100 to 180° C. preferably of from 120 to 160° C., and more preferably of from 135 to 145° C.

49. The process of any one of embodiments 45 to 48, wherein the calcining according to one or more of (d1), (g1), (d2) and (g2) is effected using a gas atmosphere having a temperature in the range of from 350 to 550° C., preferably of from 420 to 480° C., more preferably of from 440 to 460° C.

50. The process of any one of embodiments 45 to 49, comprising disposing one or more of the intermediate slurry, the first slurry and the second slurry by wet impregnation or spraying, preferably by wet impregnation.

51. A diesel oxidation catalyst, preferably the diesel oxidation catalyst of any one of embodiments 1 to 37, obtainable or obtained by a process of any one of embodiments 45 to 50.

The present invention is further illustrated by the following examples, and reference examples.

EXAMPLES

Reference Example 1: Determination of the D90 Values

The D90 particle size as referred to in the context of the present invention was measured with a Sympatec Particle Size instrument using laser diffraction (Sympatec's HELOS system allowing the determination of the particle size distribution in the range of from 0.1 to 8,750 micrometer). According to this method, the particle size distribution was evaluated with a parameter-free and model-independent mathematical algorithm, accomplished by the introduction of the Phillips-Twomey algorithm for the inversion process.

Example 1: Diesel Oxidation Catalyst Having Two Layers

For the second layer, a second slurry was prepared by slowly adding 32,000 g $TiO_2$ (DT-52 $TiO_2$ containing about 10 weight-% $WO_3$, Cristal Chemical Company) to a solution of 850 g vanadium oxalate in distilled water resulting in dispersion 1. After stirring for 5 minutes, ammonium hydroxide was added to dispersion 1 as an aqueous solution containing 1.67 weight-% of the total weight of dispersion 1 to adjust the pH in the range of from 4.5 to 5.5. The resulting dispersion was stirred for another 5 minutes. Then, 1,600 g of a silica dispersion (Ludox® AS-40 colloidal silica) was added thereto while stirring for 10 minutes resulting in the second slurry. The second slurry was then disposed onto 50% of the length of the substrate (NGK high porous cordierite, 10.5"×6" cylindrically shaped substrate with 360 cells per square inch and 8 mil wall thickness) from the rear end of the substrate at a total loading of 5.5 g/in³. The resulting substrate was dried at 120° C. and then calcined at 450° C. resulting in a substrate having the second layer disposed thereon. In the second layer, the loading of vanadium calculated as vanadium pentoxide was 0.13 g/m³ and the loading of the titania was 5.09 g/in³.

For the first layer, a first slurry was prepared by mixing 9,000 g of silica-alumina (Siralox 1,5/100, Sasol) with a diluted aqueous $HNO_3$ solution resulting in a silica-alumina containing slurry. Separately, a mixture of acetic acid, water and 3600 g of $Zr(OH)_4$ (MEL Chemicals) was prepared. Said mixture was then added to the silica-alumina containing slurry. Further, 900 g of a zirconium acetate solution (30 weight-% in distilled water) was added thereto. The resulting slurry was then milled until the D90 particle size determined as described in Reference Example 1 herein was between 9 micrometer and 11 micrometer in diameter. Thus, a Zr/silica-alumina containing slurry is obtained. Separately, 18,000 g of $TiO_2$ (titanium dioxide type II, Sachtleben) was wet impregnated with platinum using a platinum precursor with platinum as an ammine stabilized hydroxo Pt(IV) complex (Pt content between 10 and 20 weight-%) resulting in a $Pt/TiO_2$ containing mixture. To this $Pt/TiO_2$ containing mixture, acetic acid and water were added to give the final $Pt/TiO_2$ containing slurry.

Finally, the Zr/silica-alumina containing slurry, octanol and the final $Pt/TiO_2$ containing slurry were mixed to obtain the first slurry. The first slurry was then coated from the front end of the substrate at a total loading of 1.013 g/in³ onto 50% of the length of the substrate having the second layer disposed thereon. The obtained substrate was dried at around 120° C. and then calcined at 450° C. In the first layer, the platinum loading was 15 g/ft³, the sum of the loading of silica-alumina and of zirconia was 0.341 g/in³, and the loading of titania was 0.663 g/in³.

Accordingly, the loading of platinum on the substrate was about 2.25 g.

Example 2: Diesel Oxidation Catalyst Having Two Layers

Example 2 was prepared as Example 1 whereby the geometrical order of the layer was inversed.

Thus, the first slurry and the second slurry were prepared as in Example 1. The first slurry was disposed onto 50% of the length of the substrate (NGK high porous cordierite, 10.5"×6" cylindrically shaped substrate with 360 cells per square inch and 8 mil wall thickness) from the rear end of the substrate at a loading of 1.013 g/in³. The resulting substrate was dried at 120° C. and then calcined at 450° C. resulting in a substrate having the first layer disposed thereon. In the first layer, the loading of the platinum was 15 g/ft³, the sum of the loading of silica-alumina and of the loading of zirconia was 0.341 g/in³ and the loading of titania was 0.663 g/in$^3$. Then, the second slurry was coated from the front end of the substrate at a loading of 5.5 g/in$^3$ onto 50% of the length of the substrate having a first layer disposed thereon. The obtained substrate was dried at around 120° C. and then calcined at 450° C. In the second layer, the loading of vanadium calculated as vanadium pentoxide was 0.13 g/in$^3$ and the loading of the titania was 5.09 g/in$^3$. Accordingly, the loading of platinum on the substrate was about 2.25 g.

Example 3: Diesel Oxidation Catalyst Having One Layer

A slurry was prepared as the first slurry in Example 1. The slurry was then coated onto 100% of the length of the substrate (NGK cordierite, 12"×6" cylindrically shaped substrate with 400 cells per square inch and 4 mil wall thickness) at a total loading of 1.013 g/in$^3$. The obtained substrate was dried at around 120° C. and then calcined at 450° C. In the layer, the platinum loading was 10 g/ft$^3$, the sum of the loading of silica-alumina and of the loading of zirconia was 0.341 g/in$^3$ and the loading of titania was 0.663 g/in$^3$. Accordingly, the loading of platinum on the substrate was about 3.93 g.

Example 4: Use of the DOCs According to Examples 1, 2 and 3—Exotherm, NO$_2$ Make, DOC$_{out}$ HC Slip The diesel oxidation according to Examples 1, 2 and 3 were tested on an EU V 13 L engine. Upstream of the DOC to be tested a hydrocarbon injector was set (PWM controlled). Gas composition measurements were carried out using a FTIR spectrometer (Horiba MEXA-6000-FT), NO$_x$-Sensors (CSM NO$_x$ CANg for the gas stream before entering the DOC, Continental/BMW AG 5WK96610L 11787587-05 for gas stream exiting the DOC), a chemoluminescence detector (Horiba MEXA-1170NX) and a hydrocarbon detector (Horiba MEXA-1170HFID), whereas temperature measurements were carried out using thermocouples (Hettstett GmbH, Typ K).

The test protocol was as follows:
1. HC was injected for 570 seconds to provide stable measurements
2. HC slip measurement was carried out for 30 seconds
3. HC injection was turned off (time spent: 300 seconds)
4. Cool off for 600 seconds
5. Conditioning was performed before NO oxidation measurement for 1800 seconds
6. NO oxidation measurement 30 seconds Measurement of Exotherm For measurements of an exotherm, the temperature of the gas was determined in the DOC after 3 inches from the front end of the substrate of an example and after the DOC. Each of the two resulting curves represents an exotherm. Accordingly, the exotherm for Example 1 is shown in FIG. 1 and the exotherm for Example 2 is shown in FIG. 2. Thus, it has been found that the exotherm for Example 2 shows a temperature peak between 25000 and 30000 seconds. In contrast, the exotherm for Example 1 does not show such a peak. However, such a temperature peak may lead to an irreversible damage of the washcoat of a catalyst resulting in diminished catalyst performance. Accordingly, the catalyst according to Example 1 shows a better performance in view of the generation of a favorable temperature especially for regeneration of a downstream CSF.

Measurement of NO$_2$/NO$_x$ Ratio

The tests for measuring the NO$_2$ make were carried out under NO$_x$ only conditions, this means that no ammonia was added. The space velocity for each test run was set at 300 to 350 kg/h. Thus, the NO$_2$/NO$_x$ ratio was determined relative to the temperature of the gas at five different temperatures in the range of from 200 to 400° C. The amount of NO$_x$ equals the sum of the amounts of NO and NO$_2$. The resulting curve represents the light-off curve. The light-off curve was measured for diesel oxidation catalysts of Examples 1, 2 and 3. The results for the light-off are shown in FIG. 3. As can be taken from FIG. 3, it has been found that the diesel oxidation catalyst of Example 3 shows the highest NO$_2$/NO$_x$ ratio in the temperature range of from 200 to 400° C. However, it has to be taken into account that Example 3 contains a much higher loading of platinum group metal being 3.93 g of Pt whereas Examples 1 and 2 each contain only 2.25 g of Pt. The diesel oxidation catalyst of Example 1 shows a higher NO$_2$/NO$_x$ ratio than the DOC of Example 2 at a temperature of about 330° C. Overall, the NO$_2$/NO$_x$ ratio for the DOCs of Examples 1 and 2 are very similar.

Measurement of DOC(Out) HC Slip

In order to determine the hydrocarbon slip exiting a DOC (DOC$_{out}$ HC slip), hydrocarbon measurements were conducted at steady state points. Eleven steady state points (designated as load points) have been chosen to balance test expediency. Thus, the three diesel oxidation catalysts according to Examples 1 to 3 have been tested in view of their DOC$_{out}$ HC slip. The characteristics of the eleven steady state points (LP1 to LP12) are shown in Table 1 below. Thus, the DOC$_{out}$ HC slip was determined relative to each steady state point. The results are shown in FIG. 4.

TABLE 1

Characteristics of the eleven steady state points measurements

| Load Point | DOC$_{in}$ Temp [° C.] | Exhaust Massflow [kg/h] | NO$_x$ [ppm] |
|---|---|---|---|
| LP1 | 365 | 928 | 777 |
| LP2 | 370 | 659 | 1095 |
| LP3 | 394 | 295 | 2424 |
| LP4 | 316 | 959 | 622 |
| LP5 | 325 | 704 | 622 |
| LP6 | 335 | 317 | 1552 |
| LP7 | 292 | 1050 | 458 |
| LP8 | 296 | 722 | 587 |
| LP9 | 305 | 341 | 941 |
| LP10 | 277 | 728 | 493 |
| LP11 | 286 | 362 | 794 |

As can be taken from FIG. 4, the diesel oxidation catalyst of Example 3 is outperformed by the other two catalysts especially when the DOC$_{in}$ temperature is comparatively low and the exhaust mass flow comparatively high, in particular at LP4, LP5, LP7 and LP8. Overall, the catalysts of Example 1 and 2 perform comparatively well.

CITED LITERATURE

WO 2015/189680 A1

Figure 1:
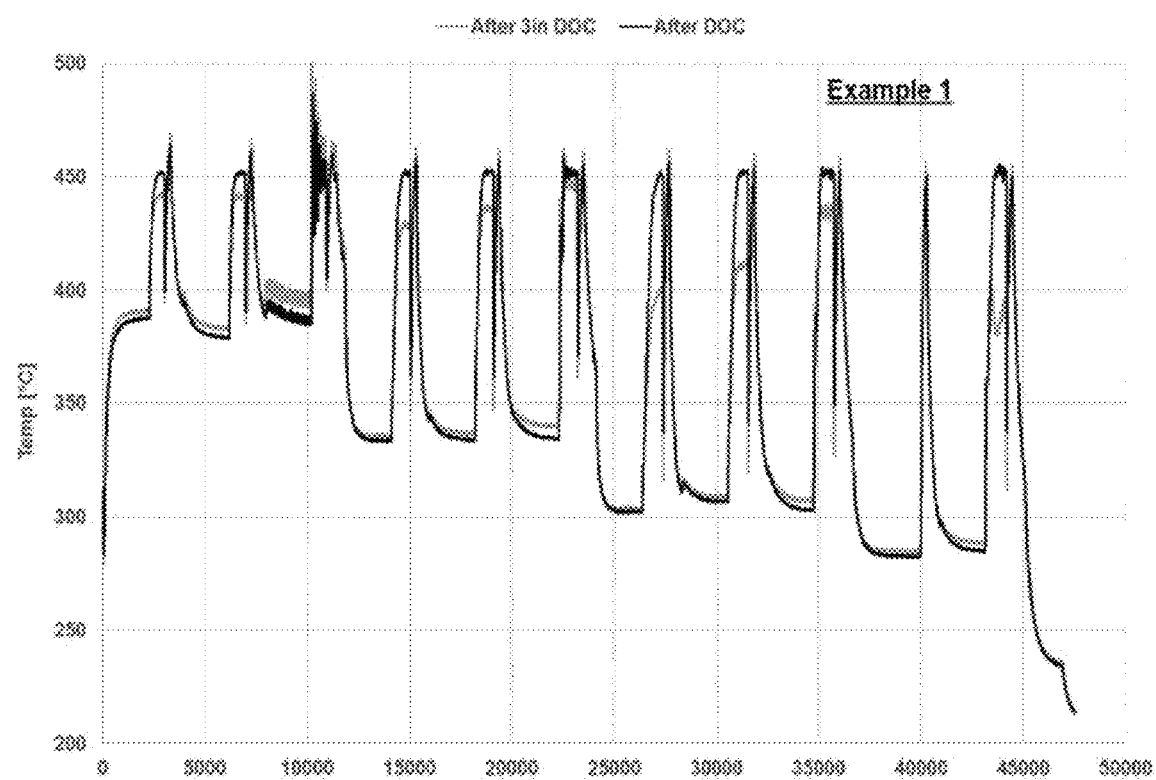
FIG. 1: shows the exotherm according to Example 4 of the inventive diesel oxidation catalyst according to Example 1. In the figure, the time is shown on the abscissa and the temperature is shown on the ordinate.
Figure 2:
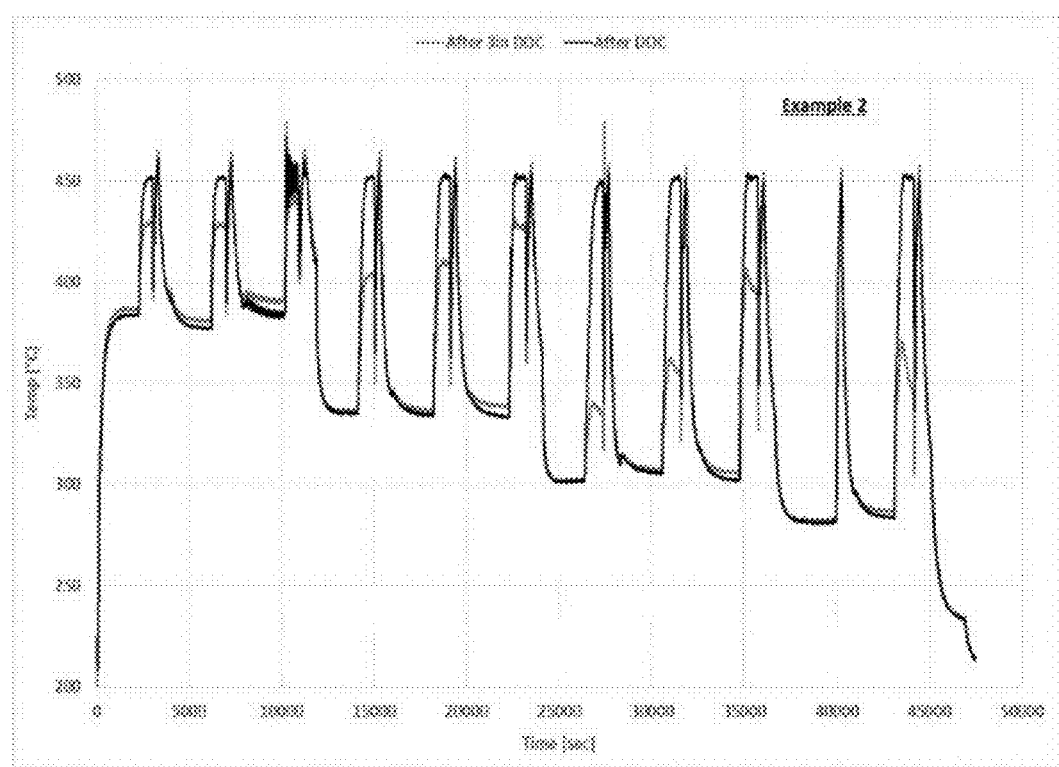
FIG. 2: shows the exotherm according to Example 4 of the diesel oxidation catalyst according to Example 2. In the figure, the time is shown on the abscissa and the temperature is shown on the ordinate.
Figure 3:
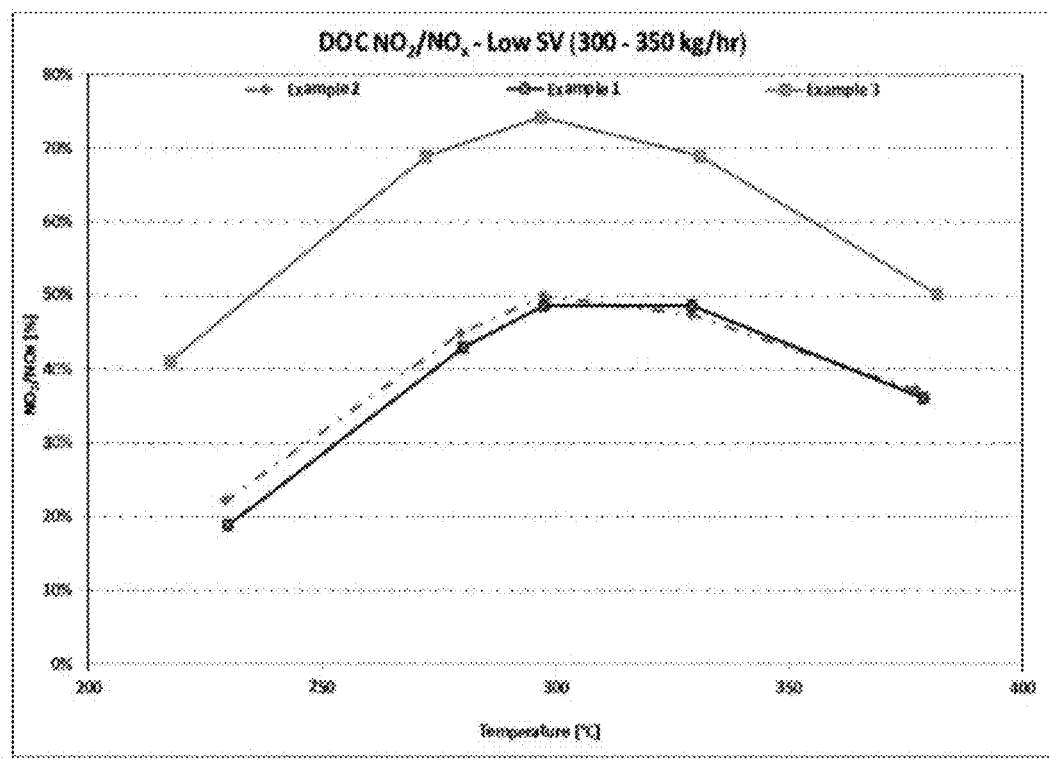
FIG. 3: shows the light-off curve of the diesel oxidation catalyst of Examples 1, 2 and 3. In the figure, the temperature is shown on the abscissa and the $NO_2/NO_x$ ratio is shown on the ordinate.
Figure 4:
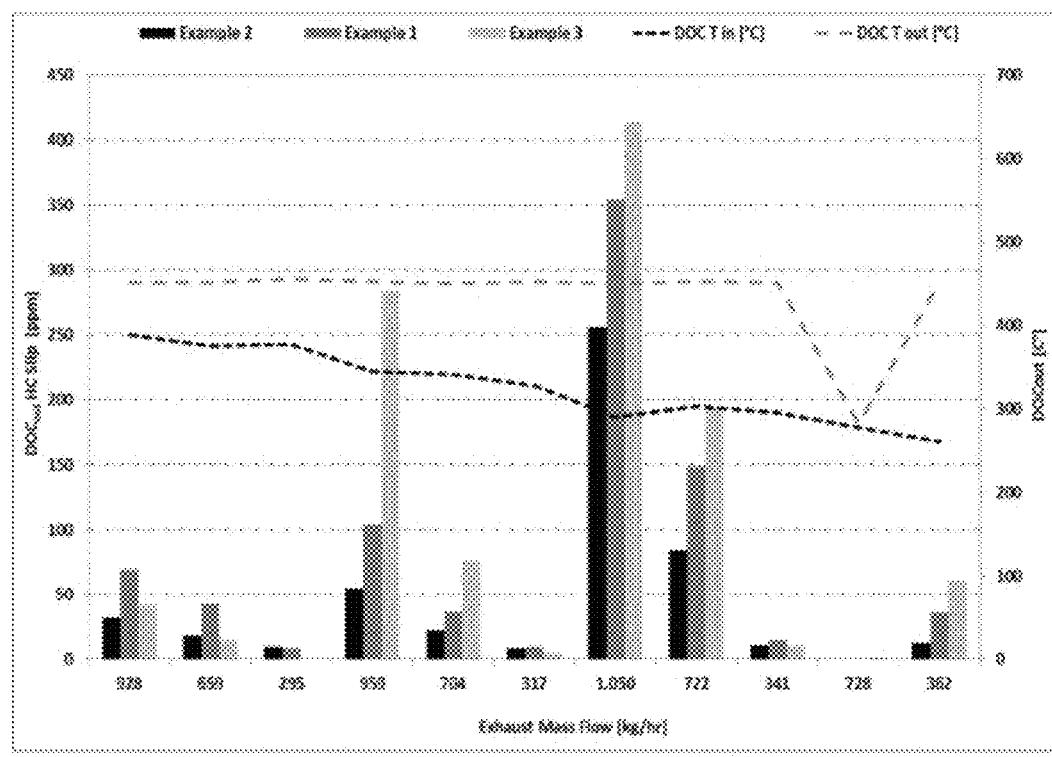
FIG. 4: shows the $DOC_{out}$ hydrocarbon slip of the diesel oxidation catalyst of Examples 1, 2 and 3 for each of the eleven steady state points. In the figure, the $DOC_{out}$ HC slip is shown on the left ordinate and the $DOC_{out}$ temperature is shown on the right ordinate relative to each of the eleven steady state points on the abscissa.

The invention claimed is:
1. A diesel oxidation catalyst comprising a substrate and a washcoat comprising a first layer and a second layer, wherein the substrate has a substrate length, a front end and a rear end,
 the first layer comprising a first metal oxide and a platinum group metal supported on titania, wherein the platinum group metal is not supported on the first metal oxide;
 the second layer comprising a second metal oxide, and an oxidic compound of vanadium;
 wherein the first layer is at least partially disposed directly on the substrate or is at least partially disposed directly on an intermediate layer which is disposed directly on the substrate over the entire length of the substrate,
 wherein the first layer is disposed, directly or indirectly, on x % of the length of the substrate from the front end of the substrate,
 wherein the second layer is at least partially disposed directly on the substrate or is at least partially disposed directly on the intermediate layer which is disposed directly on the substrate over the entire length of the substrate,
 wherein the second layer is disposed, directly or indirectly, on y % of the length of the substrate from the rear end of the substrate,
 wherein x is in the range of from 25 to 75 and y is in the range of from 25 to 75 and wherein x+y is in the range of from 95 to 105, and
 wherein the intermediate layer comprises alumina.
2. The diesel oxidation catalyst of claim 1, wherein x ranges from 30 to 70.
3. The diesel oxidation catalyst of claim 1, wherein y ranges from 30 to 70.
4. The diesel oxidation catalyst of claim 1, wherein x+y ranges from 96 to 104.
5. The diesel oxidation catalyst of claim 1, wherein the substrate has a plurality of longitudinally extending passages formed by longitudinally extending walls bounding and defining the passages and a longitudinal total length extending between the front end and the rear end of the substrate.
6. The diesel oxidation catalyst of claim 1, wherein the first metal oxide is one or more of gamma-alumina, zirconia-alumina, silica-alumina, silica, lanthana, lanthana-alumina, alumina-zirconia-lanthana, titania, zirconia-titania, ceria, ceria-zirconia, or ceria-alumina.
7. The diesel oxidation catalyst of claim 1 wherein the platinum group metal is one or more of Pt, Pd, or Rh.
8. The diesel oxidation catalyst of claim 1, wherein the second metal oxide is one or more of gamma-alumina, zirconia-alumina, silica-alumina, silica, lanthana, lanthana-alumina, alumina-zirconia-lanthana, titania, titania-silica, zirconia-titania, ceria, ceria-zirconia, ceria-alumina, or ferrous oxide.
9. The diesel oxidation catalyst of claim 1, wherein the oxidic compound of vanadium is one or more of an ammonium vanadate, a sodium vanadate, an iron vanadate, vanadium pentoxide, or vanadium pentoxide stabilized with ferric oxide.
10. A process for selective catalytic reduction of $NO_x$, and/or oxidation of one or more of carbon monoxide, nitrogen monoxide, or a hydrocarbon, the process comprising contacting one or more of $NO_x$, carbon monoxide, nitrogen monoxide, or a hydrocarbon with the diesel oxidation catalyst of claim 1.
11. An exhaust gas treatment system, comprising the diesel oxidation catalyst of claim 1.
12. A process for preparing the diesel oxidation catalyst of claim 1, wherein the diesel oxidation catalyst comprises one substrate,
 the process comprising
 (a) optionally disposing an intermediate slurry directly on the substrate wherein the intermediate slurry comprises alumina, thereby obtaining an intermediate slurry-treated substrate;
 (b1) disposing a second slurry on the substrate, or on the intermediate slurry-treated substrate, thereby obtaining a second slurry-treated substrate,
 wherein the second slurry comprises the second metal oxide and;
 (c1) drying the second slurry-treated substrate;
 (d1) calcining the dried second slurry-treated substrate, thereby obtaining a substrate having the second layer disposed thereon;
 (e1) disposing a first slurry on the substrate having the second layer disposed thereon, thereby obtaining a first slurry-treated substrate having the second layer disposed thereon,
 wherein the first slurry comprises the first metal oxide and the platinum group metal supported on titania, wherein the platinum group metal is not supported on the first metal oxide;
 (f1) drying the first slurry-treated substrate having the second layer disposed thereon; and
 (g1) calcining the dried first slurry-treated substrate having the second layer disposed thereon, thereby obtaining a substrate having the first and the second layer disposed thereon;
 wherein the first layer is disposed, directly or indirectly, on x % of the length of the substrate from the front end of the substrate,
 wherein the second layer is at least partially disposed directly on the substrate or is at least partially disposed directly on the intermediate layer which is disposed directly on the substrate over the entire length of the substrate, and
 wherein the second layer is disposed, directly or indirectly, on y % of the length of the substrate from the rear end of the substrate,
 wherein x is in the range of from 25 to 75 and y is in the range of from 25 to 75 and wherein x+y is in the range of from 95 to 105;
 or
 (a) optionally disposing an intermediate slurry directly on the substrate wherein the intermediate slurry comprises alumina, thereby obtaining an intermediate slurry-treated substrate;

(b2) disposing a first slurry on the substrate, or on the intermediate slurry-treated substrate, thereby obtaining a first slurry-treated substrate, wherein the first slurry comprises the first metal oxide and the platinum group metal supported on titania, wherein the platinum group metal is not supported on the first metal oxide;

(c2) drying the first slurry-treated substrate;

(d2) calcining the dried first slurry-treated substrate, thereby obtaining a substrate having the first layer disposed thereon;

(e2) disposing a second slurry on the substrate having the first layer disposed thereon, thereby obtaining a second slurry-treated substrate having the first layer disposed thereon, wherein the second slurry comprises the second metal oxide and an oxidic compound of vanadium;

(f2) drying the second slurry-treated substrate having the first layer disposed thereon; and (g2) calcining the dried second slurry-treated substrate having the first layer disposed thereon, thereby obtaining a substrate having the first and the second layer disposed thereon;

wherein the first layer is disposed, directly or indirectly, on x % of the length of the substrate from the front end of the substrate, wherein the second layer is at least partially disposed directly on the substrate or is at least partially disposed directly on the intermediate layer which is disposed directly on the substrate over the entire length of the substrate, and wherein the second layer is disposed, directly or indirectly, on y % of the length of the substrate from the rear end of the substrate, wherein x is in the range of from 25 to 75 and y is in the range of from 25 to 75 and wherein x+y is in the range of from 95 to 105.

13. A diesel oxidation catalyst obtained by the process of claim 12.

* * * * *